US005883308A

United States Patent [19]
Fersht

[11] Patent Number: 5,883,308
[45] Date of Patent: Mar. 16, 1999

[54] FIBER OPTIC TWIST RING ACCELEROMETER

[75] Inventor: Samuel N. Fersht, Studio City, Calif.

[73] Assignee: Litton Systems, Inc., Woodland Hills, Calif.

[21] Appl. No.: 871,457

[22] Filed: Jun. 9, 1997

[51] Int. Cl.[6] .................... G01P 15/08

[52] U.S. Cl. .................... 73/514.26; 73/514.01; 73/514.38

[58] Field of Search .................... 73/514.01, 514.23, 73/514.26, 514.38, 514.36, 653, 657; 250/227.19; 356/345

[56] References Cited

U.S. PATENT DOCUMENTS

| | | | |
|---|---|---|---|
| 4,932,258 | 6/1990 | Norling | 73/514.23 |
| 4,959,539 | 9/1990 | Hofler | 250/227.19 |
| 5,287,332 | 2/1994 | Lea | 356/345 |
| 5,317,929 | 6/1994 | Brown | 73/514.01 |

*Primary Examiner*—Christine K. Oda
*Attorney, Agent, or Firm*—Elliott N. Kramsky

[57] ABSTRACT

A fiber optic accelerometer includes a ring that is twistably-responsive to an orthogonally-directed acceleration force. The ring is mounted by means of either an inner or an outer peripheral flange comprising an annular washer to one of two concentric walls of a disk-like casing. The walls apportion the interior of the casing into a disk-like central section and a surrounding annular section. The ring is appropriately flange-mounted and proportioned to present a moment of inertial that subjects the ring to twisting in the presence of acceleration along the sensitive input axis. Flat spiral coils of optical fiber are fixed to the top and bottom of the ring. Each coil forms a portion of the leg of an interferometer for generating a signal responsive to the acceleration input.

4 Claims, 3 Drawing Sheets

FIBER OPTIC TWIST RING ACCELEROMETER

BACKGROUND

1. Field of the Invention

The present invention relates to apparatus for sensing linear acceleration. More particularly, this invention pertains to an open loop a.c. accelerometer employing an optical fiber pickoff for generating an interferometric output measurement.

2. Background of the Prior Art

The measurement of flexure or deformation of an elastic body in response to acceleration or pressure comprises the operating principle of numerous acceleration and pressure sensors. While the amount of deformation or displacement can be determined interferometrically, mechanically, piezoelectrically or by changes in the capacitances or inductances between elements, all such systems are limited by their physical and operational peculiarities such as limited sensitivity, high cost, limited maximum deflection and operating environment sensitivities. Some errors due to operating conditions are fundamental, such as limited physical flexure capacity in response to acceleration that renders the desired output indistinguishable from signal components associated with noise sources. Other operating condition errors can result from changes in physical dimension, modulus of elasticity, index of refraction, etc. occasioned by temperature and pressure changes.

Interferometric strain measurements exhibit superior accuracy and resolution. When carried out by means of an optical fiber, interferometric systems include simple and rugged sensor devices with low power requirements, immunity to electromagnetic interference, and ready adaptability to remote sensing and high data rates. Interferometric measurements of acceleration and pressure employing an optical fiber medium can be accomplished through telemetric signal transmission of a multitude of sensors in a single fiber using time division multiplexing. The fibers are themselves relatively insensitive per unit length and not subject to errors due to ambient pressure, tension from acceleration, etc. Increasing leg length provides greater sensitivity.

A number of a.c. acceleration measurement devices have been developed that utilize disk-mounted spiral coils of optical fiber to produce a desirable push-pull effect. U.S. Pat. No. 4,959,539 discloses a hydrophone in which each surface of an elastic and circumferentially-supported disk is round with a flat spiral of optical fiber fixed thereto. Flexure of the disk shortens the optical path length of the spiral on one surface while lengthening it on the oppositely-facing surface. The disk may be mounted on a body so that an acoustic pressure differential to be measured exists across the disks with the spirals being connected for push-pull operation as two legs of a fiber optic interferometer. In one such hydrophone, a pair of the circumferentially-supported disks and associated optical fiber spirals are mounted on opposite sides of such a body with the outer spirals connected as one interferometer leg and the inner spirals as another leg so that the differences in the lengths of the legs due to acceleration-induced flexure of the disks are cancelled. Such a double disk arrangement offers twice the measurement sensitivity. U.S. Pat. No. 5,317,929 discloses a fiber optic accelerometer based upon the double-disk structure described above that includes a centrally-located mass which clamps the opposed flexible disks together. Again, flat spiral windings of optical fiber are fixed to the surfaces of the flexible disks, providing inputs to the legs of a measuring interferometer. By adding a central mass, the device obtains greater sensitivity to acceleration without any decrease in its ability to cancel or reject d.c. effects.

U.S. Pat. No. 5,369,485 teaches another fiber optic accelerometer that employs a cascaded arrangement of disks engaged at their central portions to a cylindrical post and, at their exterior portions, to a coaxial cylindrical mass. The axial dimension of the hollow cylindrical mass greatly exceeds its wall thickness. Again, optical fibers formed into flat coils are fixed to opposed sides of each of three disks that extend radially from the cylindrical post to the hollow cylindrical mass. The various coils are interconnected to eventually form the arms of an interferometer.

Each of the foregoing accelerometers derives optical signals as inputs to an interferometer from direct measurement of the deflections of flexible disks. As a consequence, the efficiency and strength of the signal derived is highly dependent upon the peculiarities of the reaction of the flexible disk to acceleration. Generally, one may expect the deformation of a flexible disk to assume a two-dimensional shape that includes an intermediate inflection point between its clamped center and circumference. Unfortunately, this does not coincide with the region of the overlying spiral coil that is most capable of changing optical path length in response to stressing. Thus, an inherent mismatch minimizes the amount of signal generated per unit of strain-induced acceleration in such prior art devices. Further, by mounting coils to opposed faces of the relatively-thin flexible disk, the difference in optical path lengths experienced in compression and tension are relatively minimal. Again, this leads to a relatively "weak" output at the interferometer in response to acceleration. Sensitivity at low levels of acceleration may, in fact cut off the useful range of the sensor.

SUMMARY OF THE INVENTION

The present invention addresses the foregoing and other problems of the prior art by providing apparatus for sensing linear acceleration along a predetermined direction. Such apparatus includes a substantially-hollow disk-shaped casing. The casing comprises a pair of circular plates separated by a circumferential wall. A ring is provided with means for flexibly mounting within the casing. Means, fixed to the ring, are further provided for measuring rotation of the ring in response to acceleration of the apparatus along the predetermined direction.

The preceding and other features and advantages of this invention will become further apparent from the detailed description that follows. Such description is accompanied by a set of drawing figures. Numerals of the drawing figures, corresponding to those of the written description, point to the various features of the invention. Like numerals refer to like features throughout both the written description and the drawing figures.

DETAILED DESCRIPTION OF THE PREFERRED EMBODIMENT

Figure 1A:
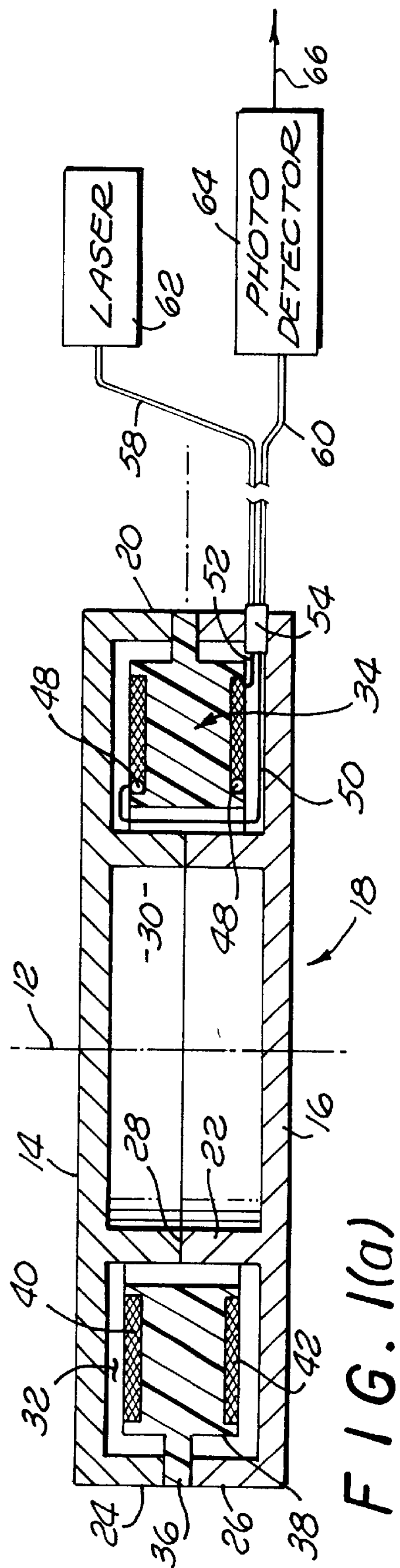
FIGS. 1(*a*) and 1(*b*) are cross sectional and partially-sectioned perspective views, respectively, of a sensor in accordance with the invention.
Figure 1B:
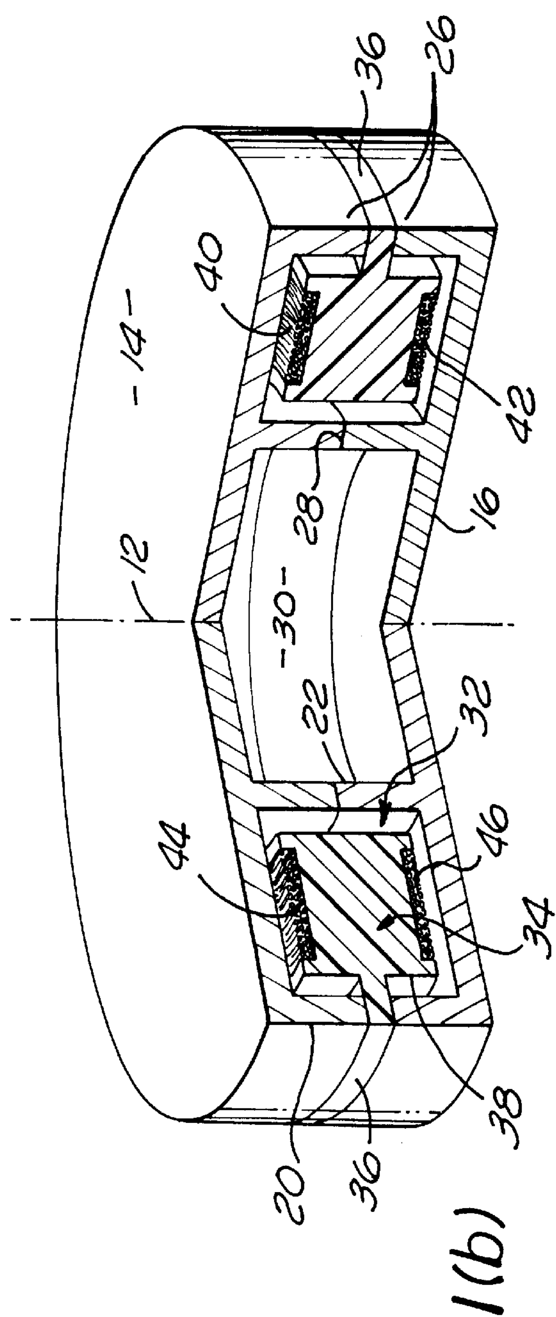
Figure 2:
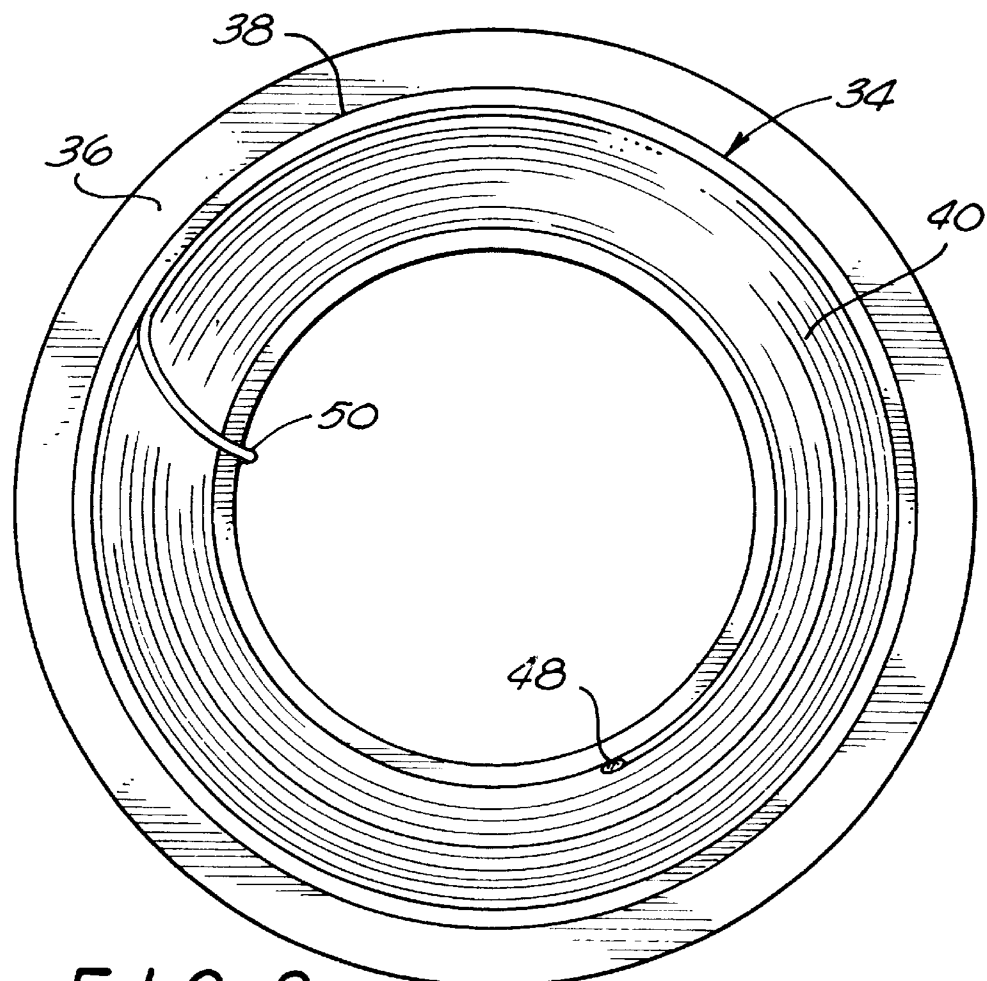
FIG. 2 is a top planar view of the twist ring of the sensor of FIGS. 1(*a*) and 1(*b*)

FIGS. 1(*a*) and 1(*b*) are cross sectional and partial perspective views of a sensor in accordance with the invention. The sensor is arranged to detect an acceleration force acting in the direction of an axis 12 perpendicular to opposed upper and lower disk-like planar surfaces 14 and 16 respectively of a sensor casing 18. The upper and lower surfaces 14 and 16 are preferably formed of aluminum or thermoplastic material of sufficient stiffness to resist the ambient pressure of the environment, permitting deflection but not allowing collapse.

A circumferential wall 20, along with an interior wall 22 coaxial therewith, maintain the upper and lower surfaces 14, 16 in spaced-apart opposed relationship. The casing 18 may be formed by assembly of mirror-image upper and lower halves 24 and 26, joined by a layer 28 of a suitable adhesive such as EPOXY. As can be seen most clearly in FIG. 1(*b*), the circumferential wall 20 and coaxial inner wall 22 combine to partition the casing 18 into disk-shaped center 30 and surrounding annular 32 compartments.

A twist ring 34 is received within the annular compartment 32 and centered coaxial with the circumferential and inner walls 20 and 22. A radially-directed washer-like flange 36 extends from the outer peripheral surface 38 of the ring 34. The outer portion of the flange 36 is received within and fixed to the circumferential wall 20 by means of suitable adhesive such as EPOXY.

The flange 36 acts as a supportive hinge or flexure for the twist ring 34. It is a central feature of the claimed invention that the ring 34 is proportioned so that, when subjected to an acceleration input along the axis 12, the encircling washer-like flange 36 will bend, assuming a monotonic shape in response to the inertial moment of the ring 34. This is achieved by providing that the horizontal component of the cross section (i.e. the radial thickness) of the twist ring 34 is at least as great as its axial height to assure that the ring 34 does not present substantial resistance to twisting.

The above-described design of the twist ring 34 produces an element that is twistably-responsive to input acceleration. This follows from the fact that the twist stiffness $K_\theta$ of a mass (i.e. its resistance to twisting) is equal to:

$$M_t \div \theta \quad (1)$$

Where:

$M_t$=moment of twist; and $\theta$=angle of twist.

The above equation may be restated as follows: For a ring of radius "a" fabricated of material of Young's modulus E and moment of inertia $I_x$ about the horizontal x axis:

$$K_\theta = EI_x \div a^2 \quad (2)$$

The moment of inertia, $I_x$, of an annular ring of rectangular cross section of height h (axial direction) and width b (radial direction) is:

$$I_x = (1/12)bh^3 \quad (3)$$

Comparing equations 1, 2 and 3 above, it is seen that the twist stiffness (resistance of the ring 30 to twisting) in response to acceleration of the sensor along the axis 12 is linearly proportional to the radial width and cubically proportional to the axial height of the ring 30. Therefore, by reducing the axial dimension relative to the radial dimension, the resistance of the resultant ring cross-section to twisting is reduced. In contrast to the prior art (e.g. U.S. Pat. No. 5,369,485), which employs a cylindrical mass whose axial height greatly exceeds its radial width, the ring 34 of the present invention is specifically designed to twist in response to acceleration. By employing a cylindrical mass of much greater height than width, a very large degree of resistance to twisting is encountered in the device of U.S. Pat. No. 5,369,485. As such, the associated disk-like flexures clamped to the prior art ring are not subject to continuous monotonic bending. Rather, a circular inflection will be observed within the disk-like flexure remote from the outer radii of the spiral coils fixed to its surface.

In contrast to the prior art, it will be seen that the flange 36 supporting the twist ring 34 will bend continuously and without inflection due to the relatively small twisting resistance offered by the ring 34. Such twisting causes the optical path lengths of disk-like flat spiral coils 40 and 42 located within upper and lower surface recesses 44 and 46 of the ring 34 to undergo relatively-substantial equal and opposite changes. As a consequence, a relatively "strong" signal output is generated for processing at the associated interferometer.

Each of the disk-like flat spiral coils 40 and 42 terminates at its inner turn in a cleaved reflective end 48 as shown in FIGS. 1(*a*) and 2. Such cleaved ends are covered by caps 48 to prevent degradation of their reflectivities due to the adhesive used to affix the spiral to the twist ring 34. The fibers comprising the upper and lower spirals 44 and 46 include extensions 50, 52 from their outer turns to one end of a 3 dB coupler 54 that is received in a fluid-sealed relationship in a bore 56 within the cylindrical wall 20.

Leads 58, 60 of optical fiber extend from the other end of the coupler 54 to a laser source 62 and to a photodetector 64. Breaks in the fibers 58 and 60 are provided to indicate that the leads may be relatively long so that the laser 62 and the detector 64 can be positioned remote from the rest of the sensor.

As will be appreciated by one skilled in the art, the spiral coils 44 and 46 are connected as legs of a Michelson interferometer, a preferred arrangement due to its sensitivity and requirement of only a single connection to each of the spirals. However, this invention may be practiced with optical fiber spirals, similar to those of the spirals 44 and 46, employed in a Mach-Zehnder, Sagnac, Fabry-Pero or other interferometer.

Referring to the arrangement of FIG. 1(*a*), light emitted from the laser 62 passes through the coupler 54 wherein it is transmitted via the coupler 54 to the spiral coils 44 and 46 and is reflected at the caps 48, back to the coupler 54 and combined therein to generate light having variations in intensity due to interference fringes. Such fringes correspond to variations of the relative length of the optical path of light within the optical fiber comprising the upper coil 44 and that travelling through the lower spiral coil 46. In the present invention, such variations and optical path lengths result from the tilting or twisting of the ring 34 as described below. The varying light intensity reflected by the fringes is transmitted to the detector 64 which converts the light variations to corresponding variations in an electrical output signal 66 for application to a suitable display, demodulation or other use.

Figure 3A:
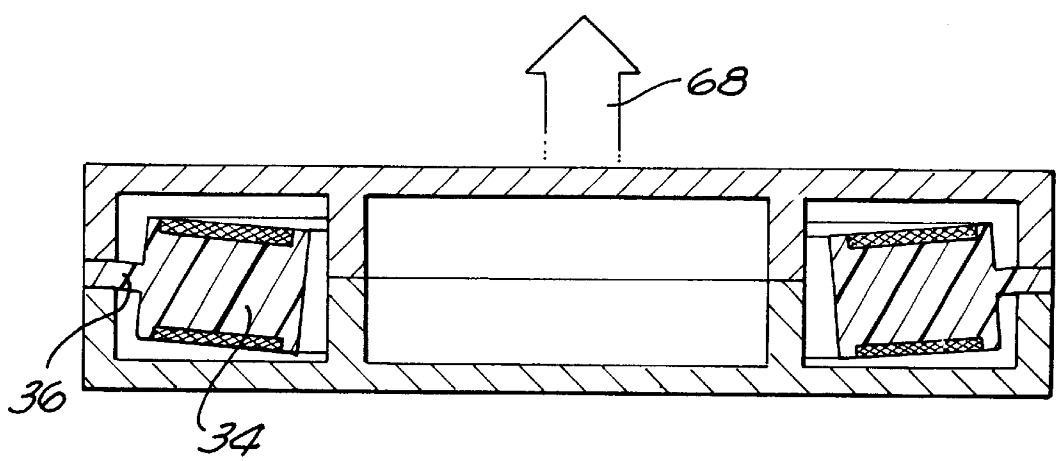
FIGS. 3(*a*) and 3(*b*) are cross-sectional views of the sensor of FIGS. 1(*a*) and 1(*b*) generally and in detail, respectively, for illustrating the response of the twist ring of the sensor to acceleration along the input axis.
Figure 3B:
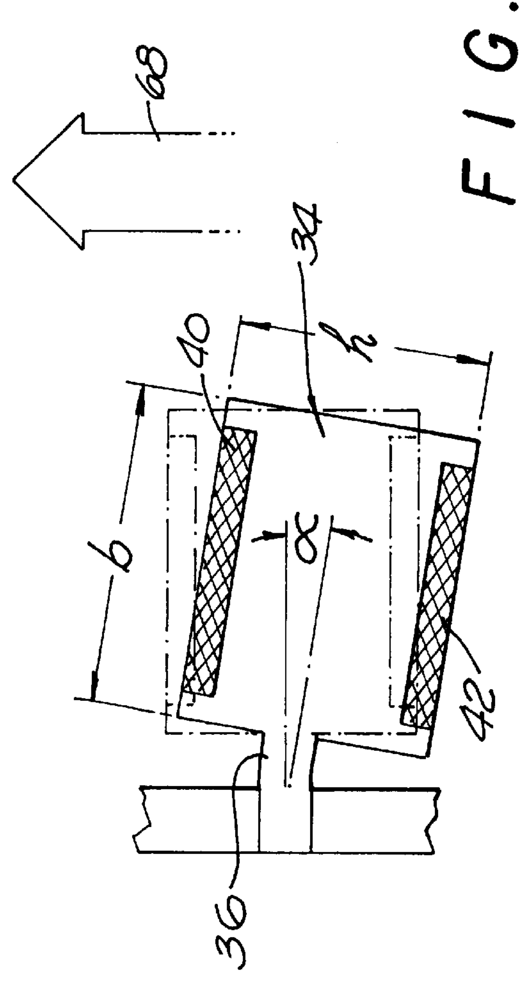

FIG. 3(*a*) is a cross-sectional view of portions of the sensor of the invention for illustrating the deflection of the twist ring 34 in response to an upward acceleration force indicated by an arrow 68 that is directed along the sensitive axis 12. The sensor of the invention is somewhat simplified in FIG. 3(*a*) for purposes of clarity. As the sensor undergoes the acceleration 68, the inertial momentum of the twist ring 34 exerts bending force upon the attached encircling flange 36 as shown. As described earlier, the design of the twist ring 34 is such that its resistance to twisting is insufficient to prevent this type of displacement. This is in contrast to prior art arrangements characterized by a moment of inertia that produces substantial resistance to twisting and attendant non-monotonic bending of the flexible disk clamped thereto.

FIG. 3(*b*) is a detailed cross-sectional view of a portion of the twist ring 34 for illustrating the relative reconfiguration of the arms of the interferometer in response to the acceleration force 68. As can be seen, the cross-section of the twist ring 34 is characterized by an axial height h that is less than the radial width b. For reasons described above, this results in monotonic bending of the flexible support flange 36 as shown.

The pre-acceleration position of the twist ring 34 is illustrated in shadow outline. As can be seen, the twist ring 34 rotates through an angle $\alpha$ in response to the acceleration force 68. Referring to the spiral coils 40 and 42 which constitute portions of the legs of a Michelson interferometer, the turns of the upper spiral coil 40 are rotated inwardly (i.e. toward the center of the ring 34) while those of the lower coil 42 are rotated outwardly. As a result, the mean optical path length of light travelling through the upper coil 40 is decreased and that of light travelling through the lower coil 42 is increased by corresponding amounts.

It is to be noted that, in contrast to prior art arrangements in which flat coils are fixed to opposed surfaces of a flexible disk, the coils 40 and 42 of the present invention are separated by the axial height of the ring 34 to assure that a meaningful optical path length differential is produced. Further, unlike such prior art devices, the path length difference is not subject to deformation of the supporting structure as the ring 34 is formed of sturdy, molded material. As the design of the ring cross-section assures a twist reaction to acceleration, the encircling flange 36 will bend as shown in FIGS. 3(*a*) and 3(*b*) without interior reversal or inflection.

As a consequence of the twist deflection of the ring 34 as illustrated in FIGS. 3(*a*) and 3(*b*), the interferometer legs formed by the coils 40, 42 and associated fibers 50 and 52 respectively present differing optical path lengths so that the interferometer formed by such fibers, the coupler 54, the laser 62 and the detector 64 sums the interferometer effects of the acceleration 64. Corresponding changes in the twist deflection of the ring 34, the bending of the flange 36 and the relative optical path lengths provided by the coils 40 and 42 would be experienced in the opposite directions were the direction of acceleration to be reversed. This, of course, will be reflected in an interferometric measurement of acceleration of opposite sign.

Figure 4:
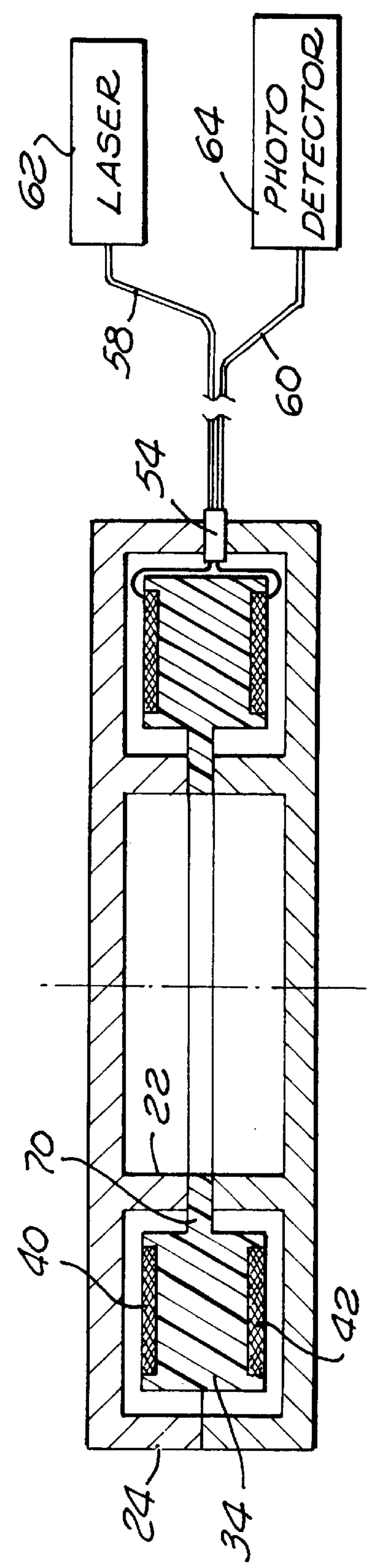
FIG. 4 is a cross-sectional view of an alternative embodiment of a sensor in accordance with the invention.

FIG. 4 is a cross-sectional view of an alternative embodiment of a sensor in accordance with the invention. Unlike the above-described device, the sensor of FIG. 4 includes a support flange 70 that joins the twist ring 34 to the inner wall 22 of the sensor casing 14. As before, the radial width b of the twist ring 34 is at least as great as the axial height h. Similarly, the inner support flange 70 is thin and of resilient material. As a result, one may expect to experience the same type of deflection of the twist ring 34 as illustrated in FIGS. 3(*a*) and 3(*b*). Thus light travelling through the upper coil 40 and the lower coils 40 and 42 will experience reciprocal changes of optical path lengths so that the interferometer formed by those fibers, the coupler 54, the laser 62 and the detector 64 sums the interferometric effects of such acceleration.

Thus, it can be seen that the present invention provides a fiber optic accelerometer capable of producing a strong, and therefor sensitive, signal indicative of acceleration along a predetermined sensitive axis. By employing the teachings of this invention, one may achieve acceleration measurements in varying environments, allowing such uses of the sealed accelerometer as a flow meter and a seismometer.

While this invention as been described with reference to its presently-preferred embodiment, it is not limited thereto. Rather, this invention is limited only insofar as it is defined by the following set of patent claims and it includes within its scope all equivalence thereof.

What is claimed:

1. Apparatus for sensing linear acceleration along a predetermined direction comprising, in combination:

(a) a substantially hollow disk-shaped casing;

(b) said casing comprising opposed circular plates separated by a circumferential wall and an interior wall coaxial with said circumferential wall for partitioning the interior of said casino into a central disk-shaped compartment and a surrounding annular compartment;

(c) a ring located within said annular compartment, said ring being of substantially rectangular cross-section, the radial width of said cross-section being at least as large as the axial height thereof;

(d) an annular washer having one edge radially fixed to said ring for flexibly mounting said ring within said annular compartment;

(e) an interferometer including a first optical fiber comprising a first flat spiral coil fixed to the top surface of said ring, a second optical fiber comprising a second flat spiral coil fixed to the bottom surface of said ring, said first and second optical fibers comprising the legs of said interferometer for measuring angular displacement in response to acceleration along said predetermined direction.

2. Apparatus as defined in claim 1 wherein the opposed edge of said annular washer is fixed to the inner surface of said circumferential wall.

3. Apparatus as defined in claim 1 wherein the opposed edge of said annular washer is fixed to the outer surface of said interior circular wall.

4. Apparatus as defined in claim 1 wherein said casing comprises matching upper and lower casing members.

* * * * *